(12) United States Patent
Love et al.

(10) Patent No.: US 7,181,170 B2
(45) Date of Patent: Feb. 20, 2007

(54) APPARATUS AND METHOD FOR ADAPTIVE BROADCAST TRANSMISSION

(75) Inventors: Robert T. Love, Barrington, IL (US);
Senaka Balasuriya, Arlington Heights, IL (US); Hao Bi, Wheeling, IL (US);
Brian K. Classon, Palatine, IL (US);
Sean S. Kelley, Hoffman Estates, IL (US); David J. Krause, Hainesville, IL (US)

(73) Assignee: Motorola Inc., Schaumburg, IL (US)

( * ) Notice: Subject to any disclaimer, the term of this patent is extended or adjusted under 35 U.S.C. 154(b) by 478 days.

(21) Appl. No.: 10/744,781

(22) Filed: Dec. 22, 2003

(65) Prior Publication Data

US 2005/0138671 A1 Jun. 23, 2005

(51) Int. Cl.
*H04B 17/00* (2006.01)

(52) U.S. Cl. .................. 455/67.13; 455/63.1; 455/501; 455/450; 455/452.1; 455/464; 370/230; 370/432; 375/141; 375/346; 375/348; 714/748

(58) Field of Classification Search ............ 455/67.13, 455/501, 63.1, 450, 452.1; 714/748, 749; 375/141; 370/230, 432
See application file for complete search history.

(56) References Cited

U.S. PATENT DOCUMENTS

| | | | | |
|---|---|---|---|---|
| 5,999,977 A | * | 12/1999 | Riddle | 709/227 |
| 6,381,215 B1 | * | 4/2002 | Hamilton et al. | 370/236 |
| 6,400,695 B1 | * | 6/2002 | Chuah et al. | 370/310 |
| 6,408,009 B1 | * | 6/2002 | Campbell et al. | 370/461 |
| 6,480,525 B1 | * | 11/2002 | Parsa et al. | 375/141 |
| 6,590,865 B1 | * | 7/2003 | Ibaraki et al. | 370/230 |
| 6,757,293 B1 | * | 6/2004 | Chuah et al. | 370/432 |
| 6,829,227 B1 | * | 12/2004 | Pitt et al. | 370/329 |
| 6,937,641 B2 | * | 8/2005 | Li et al. | 375/141 |
| 6,957,063 B1 | * | 10/2005 | Kåll | 455/414.1 |

* cited by examiner

*Primary Examiner*—Marceau Milord
(74) *Attorney, Agent, or Firm*—Matthew C. Loppnow (57) ABSTRACT

An apparatus and method for adaptive broadcast transmission. A broadcast transmission can be received. Insufficiency of a broadcast channel quality can be determined. A negative acknowledgement signal can be sent on a common uplink channel in response to determining the broadcast channel quality is insufficient. The negative acknowledgement signal can be received on the common uplink channel at another location, the negative acknowledgement signal indicating broadcast channel quality is insufficient. The broadcast channel quality can be adjusted in response to receiving the negative acknowledgement signal.

32 Claims, 9 Drawing Sheets

FIG. 1

| | BROADCAST CHANNEL | | |
|---|---|---|---|
| 220 NACK INDICATOR | 240 QUALIITY LEVEL INDICATOR | 260 SERVICE INDICATOR | 280 PREAMBLE SEQUENCE INDICATOR |
| 0 | 0 | 0 | 0 |
| 1 | 0 | 1 | 1 |
| 2 | 0 | 2 | 2 |
| 3 | 0 | 3 | 3 |
| 4 | 0 | 4 | 4 |
| 5 | 0 | 5 | 5 |
| 6 | 0 | 6 | 6 |
| 7 | 0 | 7 | 7 |
| 8 | 1 | 0 | 8 |
| 9 | 1 | 1 | 9 |
| 10 | 1 | 2 | 10 |
| 11 | 1 | 3 | 11 |
| 12 | 1 | 4 | 12 |
| 13 | 1 | 5 | 13 |
| 14 | 1 | 6 | 14 |
| 15 | 1 | 7 | 15 |

APPARATUS AND METHOD FOR ADAPTIVE BROADCAST TRANSMISSION

BACKGROUND

1. Field

The present disclosure is directed to an apparatus and method for adaptive broadcast transmission. More particularly, the present disclosure is directed to adjusting attributes of a broadcast transmission according to the quality of the broadcast transmission received by user equipment.

2. Description of Related Art

Presently, broadcast services can be used to send a broadcast transmission to multiple users. These broadcast services require minimal involvement from the receiver. For example, no automatic request for retransmission information, such as acknowledgement signals, or channel quality signaling is required from the receiver or used at the broadcast transmitter. While multiple modulation and coding schemes and power levels may be available to non-broadcast users, the broadcast transmission uses a fixed modulation and coding scheme. Unfortunately, the selected scheme may not be efficient because it may use too many resources. The selected scheme may also be inefficient because it may provide too low a data rate for the current set of broadcast receivers or because it may provide too high a data rate or too high a received error rate for the current set of broadcast receivers. Thus, there is a need for providing adaptive broadcast transmission.

BRIEF DESCRIPTION OF THE DRAWINGS

The embodiments of the present invention will be described with reference to the following figures, wherein like numerals designate like elements, and wherein.

DETAILED DESCRIPTION

The disclosure provides an apparatus and method for adaptive broadcast transmission. According to one embodiment, the disclosure provides a method for adaptive broadcast reception in a wireless device. The method can include receiving a broadcast transmission, determining a broadcast channel quality is insufficient, and sending a negative acknowledgement signal on a common uplink channel in response to determining the broadcast channel quality is insufficient. The negative acknowledgement signal can indicate the negative acknowledgement signal is directed to a specific broadcast transmission. For example, the negative acknowledgement signal can indicate the negative acknowledgement signal is directed to a specific broadcast transmission by using at least one of a pseudo noise (PN) sequence offset, a preamble sequence selection, and a time slot assignment. Determining the broadcast channel quality is insufficient can determine the broadcast channel quality is insufficient based on detecting a selected amount of broadcast packet errors, detecting a selected amount of frame erasures, detecting a symbol error rate is above a threshold, detecting an undesirable signal to noise ratio, and/or detecting a broadcast packet error using a cyclic redundancy check code. The common uplink channel can be a random access channel. Determining a broadcast channel quality is insufficient can determine a specific layer quality of a multi-layer broadcast service channel is insufficient. Sending a negative acknowledgement signal on a common uplink channel in response to determining the broadcast channel quality is insufficient can include sending a negative acknowledgement signal on a common uplink channel indicating the specific layer quality is insufficient in response to determining the broadcast channel quality is insufficient. Determining a broadcast channel quality is insufficient can include computing a broadcast channel quality metric, comparing the broadcast channel quality metric to a threshold, and determining the broadcast channel quality is insufficient based on a result of comparing the broadcast channel quality metric to the threshold. For example, determining the broadcast channel quality is insufficient based on a result of comparing the broadcast channel quality metric to the threshold can determine the broadcast channel quality is insufficient if the broadcast channel quality metric exceeds the threshold.

According to another embodiment, the present disclosure provides an apparatus for adaptive broadcast reception in a wireless device. The apparatus can include a transceiver configured to receive a broadcast transmission and a controller configured to determine whether a broadcast channel quality is insufficient and send a negative acknowledgement signal on a common uplink channel in response to determining the broadcast channel quality is insufficient. The negative acknowledgement signal can indicate the negative acknowledgement signal is directed to a specific broadcast transmission. For example, the negative acknowledgement signal can indicate the negative acknowledgement signal is directed to a specific broadcast transmission by using a PN sequence offset, a preamble sequence selection, a time slot assignment, and/or the like. The controller can determine the broadcast channel quality is insufficient based on detecting a selected amount of broadcast packet errors, detecting a selected amount of frame erasures, detecting a symbol error rate is above a threshold, detecting an undesirable signal to noise ratio, detecting a broadcast packet error using a cyclic redundancy check code and/or the like. The common uplink channel can be a random access channel. The controller can determine a broadcast channel quality is insufficient by determining a specific layer quality of a multi-layer broadcast service channel is insufficient. The controller can then send a negative acknowledgement signal on a common uplink channel in response to determining the broadcast channel quality is insufficient by sending a negative acknowledgement signal on a common uplink channel indicating the specific layer quality is insufficient. The controller can further determine the broadcast channel quality is insufficient by computing a broadcast channel quality metric, comparing the broadcast channel quality metric to a threshold, and determining the broadcast channel quality is insufficient based on a result of comparing the broadcast channel quality metric to the threshold. The controller can determine the broadcast channel quality is insufficient based on a result of comparing the broadcast channel quality metric to the threshold by determining the broadcast channel quality is insufficient if the broadcast channel quality metric exceeds the threshold.

According to another embodiment, the present disclosure provides a method for adaptive broadcast transmission in a wireless system. The method can include transmitting a broadcast transmission on a broadcast channel, receiving a negative acknowledgement signal on a common uplink channel, the negative acknowledgement signal indicating broadcast channel quality is insufficient, and adjusting the broadcast channel quality in response to receiving the negative acknowledgement signal. Adjusting the broadcast channel quality can include increasing a bandwidth of the broadcast transmission, increasing a power of the broadcast transmission, decreasing a code rate of the broadcast transmission, decreasing an information rate of the broadcast transmission, stopping the broadcast transmission, and/or increasing a number of time slots assigned to the broadcast transmission. An alternative to stopping the broadcast transmission is to signal the specific user equipment receiving the broadcast service with insufficient quality to stop receiving the broadcast service or one or more of the broadcast service layers. The method can also include determining the negative acknowledgement signal as belonging to a specific broadcast transmission, where adjusting further includes adjusting an attribute of the specific broadcast transmission in response to receiving the negative acknowledgement signal. The method can further include determining the negative acknowledgement signal as belonging to a specific broadcast transmission by using at least one of a PN sequence offset, a preamble sequence selection, and a time slot assignment. The method can additionally include generating an energy metric and determining the broadcast channel quality is insufficient by comparing the energy metric to a threshold. Adjusting the broadcast channel quality in response to receiving the negative acknowledgement signal can include modifying attributes of the broadcast channel. The attributes of the broadcast channel can include a signal strength, a coding rate, a data rate, a bandwidth, and/or a fraction of code space utilized. Receiving a negative acknowledgement signal on a common uplink channel can include receiving a plurality of negative acknowledgement signals on a common uplink channel from a plurality of users where the method further includes aggregating the plurality of negative acknowledgement signals.

Thus, for example, multiple negative acknowledgment (NACK) signals from different broadcast users of the same broadcast service can be demodulated and combined. The signals can be discriminated as coming from more than one user by delay properties and multiple rays detected from each user. The signals can also be discriminated as coming from more than one user by inferring such from the total amount of energy detected assuming some maximum power is received per user. It can then be possible to determine an outage target, for example, where no more than 3% of the users are transmitting the broadcast NACK signals.

According to another embodiment, the present disclosure provides an apparatus for adaptive broadcast transmission in a wireless system. The apparatus can include a transceiver configured to transmit a broadcast transmission on a broadcast channel and a controller configured to receive a negative acknowledgement signal on a common uplink channel, the negative acknowledgement signal indicating a broadcast channel quality is insufficient. The controller can be further configured to adjust the broadcast channel quality in response to receiving the negative acknowledgement signal. The controller can adjust the broadcast channel quality by at least one of increasing a bandwidth of the broadcast transmission, increasing a power of the broadcast transmission, decreasing a code rate of the broadcast transmission, decreasing an information rate of the broadcast transmission, stopping the broadcast transmission, and/or increasing a number of time slots assigned to the broadcast transmission. The controller can also be configured to determine the negative acknowledgement signal as belonging to a specific broadcast transmission and increase the transmit power of the specific broadcast transmission in response to receiving the negative acknowledgement signal. The controller can be further configured to determine the negative acknowledgement signal as belonging to a specific broadcast transmission by using at least one of a PN sequence offset, a preamble sequence selection, and a time slot assignment. The controller can additionally be configured to generate an energy metric and determine the broadcast channel quality is insufficient by comparing the energy metric to a threshold. The controller can adjust the broadcast channel quality in response to receiving the negative acknowledgement signal by modifying attributes of the broadcast channel. The attributes of the broadcast channel can include a signal strength, a coding rate, a data rate, a bandwidth, and/or a fraction of code space utilized. The controller can receive a negative acknowledgement signal on a common uplink channel by receiving a plurality of negative acknowledgement signals on a common uplink channel from a plurality of users and the controller can aggregate the plurality of negative acknowledgement signals.

Figure 1:
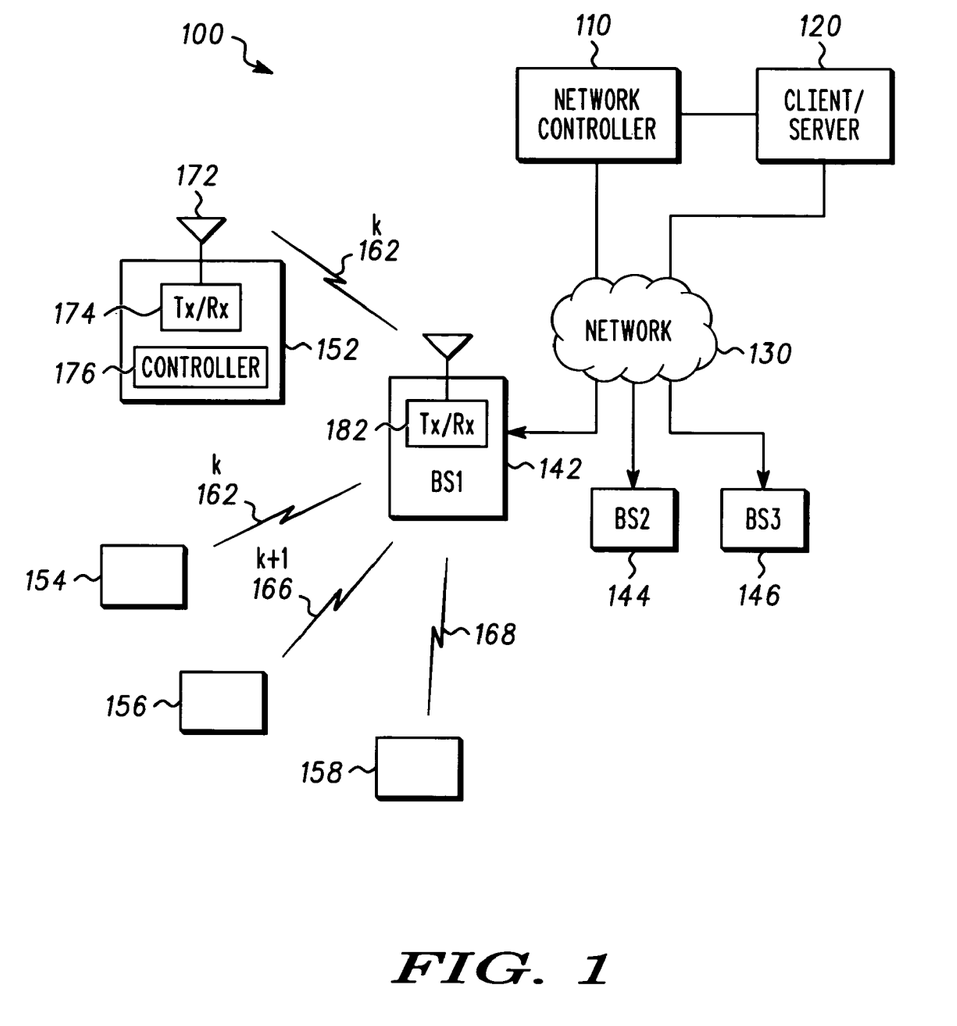
FIG. 1 is an exemplary block diagram of a system according to one embodiment.

FIG. 1 is an exemplary block diagram of a system 100 according to one embodiment. The system 100 can include a network controller 110, a client/server 120, base stations 142, 144, and 146, and user equipment 152, 154, 156, and 158. The user equipment 152, 154, 156, and 158 may include telephones, wireless telephones, cellular telephones, personal digital assistants, pagers, personal computers, mobile communication devices, or any other device that is capable of sending and receiving communication signals on a network including wireless network. The client/server 120 may be connected to the network controller 110, may be located at the network controller 110, or may be located elsewhere on the network. The network controller 110 may be located at a base station, may be located at a radio network controller, may be autonomous, or may be located anywhere else on the network 130. The network 130 may include any type of network that is capable of sending and receiving signals, such as wireless signals. For example, the network 130 may include a wireless telecommunications network, a cellular telephone network, a satellite communications network, and other like communications systems capable of sending and receiving wireless messaging service messages. Furthermore, the network 130 may include more than one network and may include a plurality of different types of networks. Thus, the network 130 may include a plurality of data networks, a plurality of telecommunications networks, a combination of data and telecommunications networks and other like communication systems capable of sending and receiving communication signals.

In operation, the network controller 110 can control operations on the network 130. For example, the network controller 110 can inform the user equipment 152 of various possible broadcast services provided by the client/server 120 and the user equipment 152 can select at least one desired broadcast service or different layers of different broadcast services. The network controller 110 can pass selected broadcast services from the client/server 120 to the user equipment 152 via the network 130 and the base station 142. For exemplary purposes, the user equipment 152 and 154 can be receiving one broadcast service k 162, user equipment 156 can be receiving another broadcast service k+1 166, and user equipment 168 can be utilizing some other wireless service 158 such as voice communications.

If each user equipment 152 and 154 is receiving sufficient quality broadcast service k on broadcast channel k, each user equipment 152 and 154 may not transmit a broadcast channel negative acknowledgement (NACK) on a broadcast channel NACK common uplink channel. If only one user equipment 152 is receiving insufficient quality broadcast service k, then the user equipment 152 can transmit a broadcast channel NACK on a broadcast channel NACK common uplink channel. If both user equipment 152 and 154 are receiving insufficient quality broadcast service k, then both user equipment 152 and 154 can transmit a broadcast channel NACK on a broadcast channel NACK common uplink channel. Thus, both user equipment 152 and 154 use the same broadcast service identifier for the broadcast channel NACK. The base station 142 can combine the energy of the broadcast channel NACK from both users to help determine if the base station 142 should modify broadcast channel attributes to improve the quality of the transmission. Thus, the base station 142 can control the adjustment of broadcast channel quality based on the amount of received energy from the broadcast channel NACK signals received. For example, the base station 142 may only adjust the broadcast channel quality if the received energy exceeds a specified threshold.

If the user equipment 156 is receiving insufficient quality of the broadcast service k+1, the user equipment 156 can transmit a broadcast channel NACK directed at broadcast service k+1. The base station 142 can differentiate broadcast channel NACK's directed at different broadcast services and can adjust the broadcast channel quality of each broadcast service transmission according to broadcast channel NACK's directed at the respective broadcast service channel. According to one example, whenever user equipment transmits on a broadcast NACK indicator in m out of n broadcast NACK transmission intervals, it can be required to send a message on a random access (RACH) channel to indicate it having trouble and to also indicate what the SNR of the broadcast service it is seeing. This can allow a user equipment receiving a broadcast service k from a base station 142 to inform the base station 142 that the user equipment is persistently receiving the broadcast service k with insufficient quality. The serving base station then may signal the user equipment to stop receiving broadcast service k or stop receiving one of the layers of broadcast service k.

A particular broadcast service, such as broadcast service k or broadcast service k+1, can be identified using a broadcast service identifier in the broadcast channel NACK. This broadcast service identifier can be a PN sequence offset, a preamble sequence selection, a time slot assignment, or any other means of identifying a particular broadcast service. For example, for preamble sequence selection, preamble sequence sets can be chosen for their auto-correlation and cross correlation properties. Specifically, it can be desired that preamble sequences have low cross correlation and low auto-correlation for autocorrelation lags greater than 0. This can allow for low probability of a spurious correlation peak generated by the receiver. One example of a set of preamble sequences is a orthogonal Walsh-Hadamaard set of size 16 codes.

As another example of broadcast service identification, for PN Sequence Offset, instead of using a set of preamble sequences composed of Walsh-Hadamaard codes it is possible to instead use a single PN sequence where each broadcast channel NACK indicator represents a different time offset into the PN sequence. Like the preamble sequences, a PN sequence can have good auto and cross correlation properties and a separate scrambling code may not be necessary. One reason for still using a scrambling code can be to reduce peak-to-average ratio of the user equipment power amplifier transmissions where the scrambling code is chosen to have desirable phase shift properties on consecutive symbol transmissions such as achieved with HPSK (Hybrid Phase Shift Keying) used in W-CDMA and CDMA2000 1X.

As a further example of broadcast service identification, for time slot assignment, to further distinguish broadcast services, the broadcast channel NACK indicator can be transmitted in a specific time slot chosen by the user equipment. The time slot chosen by the user equipment can be mapped to indicate additional information such as measured quality level of the broadcast channel indicated by the broadcast channel NACK indicator. In another embodiment, the timeslot chosen can be used to indicate the broadcast service while the broadcast channel NACK indicator can be used to indicate a measured quality level of the broadcast channel. In another embodiment, the use of timeslots can be used to increase the number of broadcast channel NACK indicators, thus allowing more information to be transferred. In yet another embodiment, assigning user equipment to different time slots can be another way to determine the number users transmitting the broadcast channel NACK indicator for a particular broadcast channel service.

User equipment, such as the user equipment 152, can include an antenna 172, a transceiver 174, and a user equipment controller 176. The transceiver 174 can receive a broadcast transmission via the antenna 172. The user equipment controller 176 can control the operations of the user equipment 152. For example, the user equipment controller 176 can perform the operations disclosed herein with respect to determining the quality of a received broadcast transmission. The user equipment controller 176 can also send a broadcast channel NACK via the transceiver 174 and the antenna 172 according to the techniques disclosed herein. Also, a base station, such as base station 142, can include a transceiver 182. The transceiver 182 can be used to transmit and receive signals and transmissions.

Figure 2:
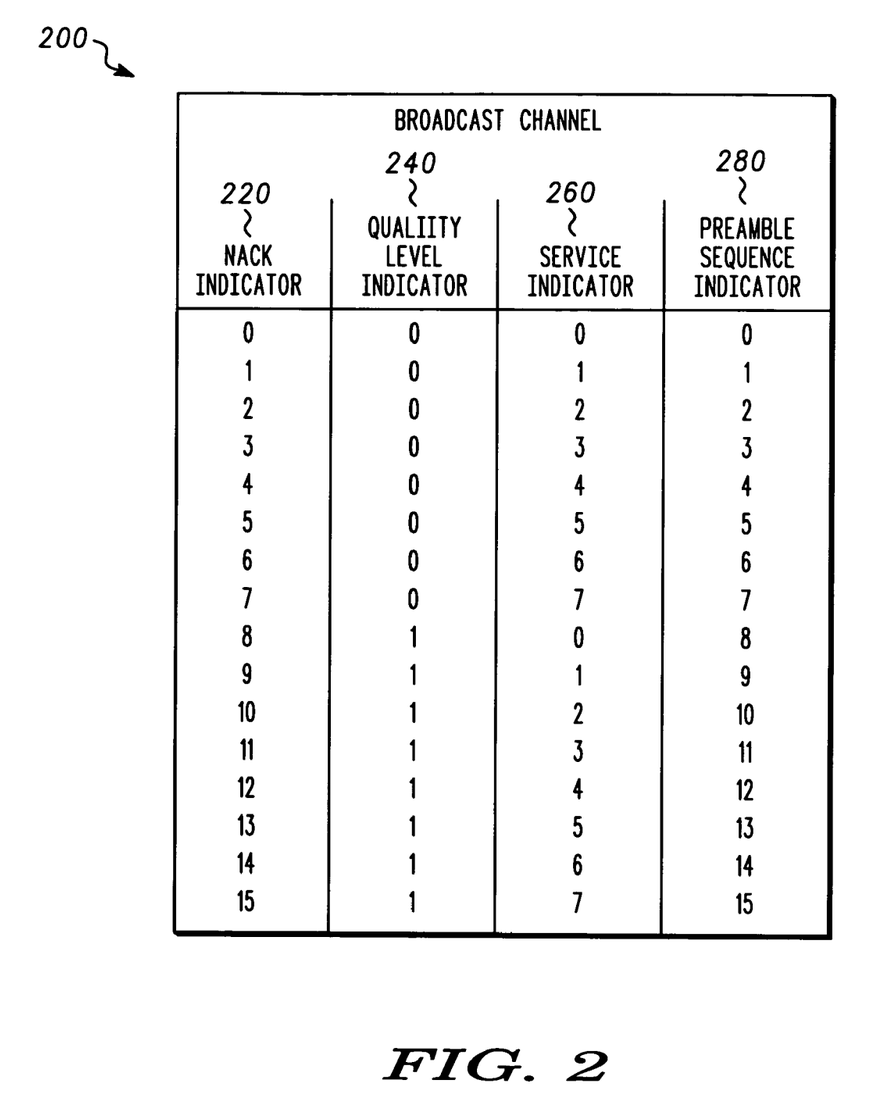
FIG. 2 is an exemplary table mapping a set of preamble sequence indicators to a set of broadcast channel negative acknowledgement indicators according to one embodiment.

FIG. 2 is an exemplary table 200 mapping a set of preamble sequence indicators 280 to a set of broadcast channel NACK indicators 220 according to one embodiment. Each of the broadcast channel NACK indicators 220 can correspond to one of the broadcast channel service indicators 260 and one of the broadcast channel quality indicators 240. The broadcast channel service indicator 260 can map to a particular broadcast service or a particular layer of a broadcast service being received at a user equipment, such as user equipment 152. The broadcast channel quality indicator 240 can map to one or more quality level ranges and is itself based on quality measurements of the broadcast channel transmissions. For example, a quality level indicator 240 of 0 can indicate a first range of unacceptable channel quality levels and a quality level indicator 240 of 1 can indicate a second range of unacceptable channel quality levels. These indicators 240 can be used by a base station to determine an amount to modify a broadcast channel attribute to improve a broadcast channel quality. In one embodiment, the broadcast channel quality measurement is based on the signal to noise ratios of broadcast channel transmissions received by the user equipment 152 over the broadcast channel k indicated by the broadcast channel service indicator 260. The single broadcast service with one broadcast channel quality range case is also supported. This case may require only one preamble sequence.

Figure 3:
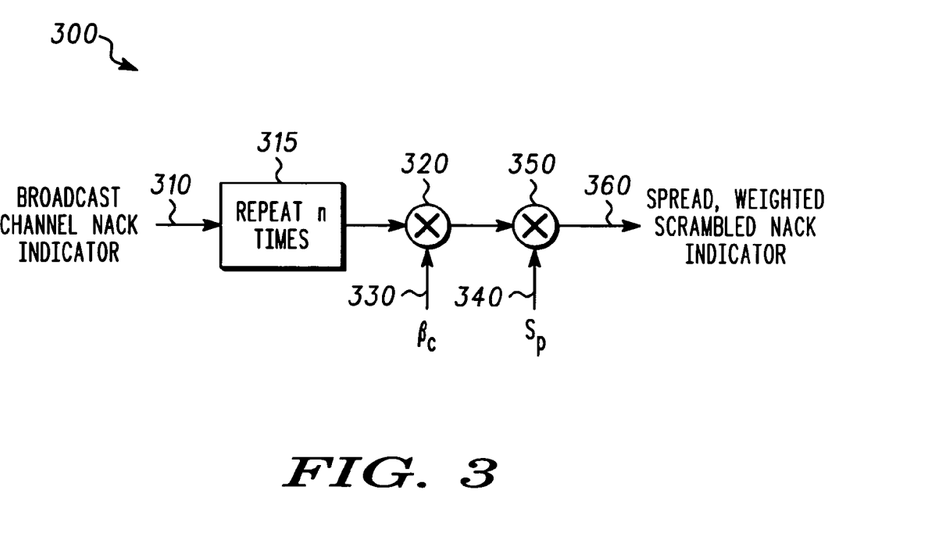
FIG. 3 is an exemplary illustration of a broadcast negative acknowledgement section of a transmitter at a user equipment according to one embodiment.

FIG. 3 is an exemplary illustration of a broadcast NACK section of a transmitter 300 at user equipment, such as user equipment 152, according to one embodiment. It is understood that different receivers may be used for different wireless systems. The transmitter 300 can include two multipliers 320 and 350. In operation, when the user equipment 152 determines the received broadcast transmission 162 is of insufficient quality, the user equipment 152 can provide a broadcast channel NACK indicator 310 to the transmitter 300. The broadcast channel NACK indicator 310 which corresponds to one of the preamble sequences 280 in the exemplary mapping 200 can be repeated n times 315 to effectively spread the preamble sequence. The spread broadcast channel NACK indicator can be weighted at multiplier 320 by a gain factor $\beta_c$ 330 to determine the power level for the broadcast channel NACK indicator 310. The gain factor may be chosen to minimize a near/far problem occurring for multiple uplink transmissions from different users at different distances from the serving cell providing the broadcast service. That is, only enough power may be transmitted to achieve the minimum uplink required SNR to achieve reliable detection or to achieve some targeted error rate. It is worth noting that user equipment in a random access state are time synchronized to the cell that they are camped on (served by) until they handoff to another cell at which point resynchronization occurs. The power level of the NACK transmission can be determined by the same procedure as used in WCDMA or CDMA2000. For example, in WCDMA Preamble Initial Power=Primary *CPICH DL Tx* power−*CPICH_RSCP*+*UL* interference+Constant Value Downlink pathloss (dB)=Primary *CPICH DL Tx* power−*CPICH_RSCP*

Constant Value (dB)=uplink *Ec/No* target

Where CPICH DL Tx power is a common pilot channel downlink transmit power, CPICH_RSCP is a common pilot channel receive strength code power, Ec/No is a signal to noise ratio, and UL interference is an uplink interference. For RACH transmissions lower values of "Constant Value" give more protection against open loop power control errors since open loop power control errors can cause the preamble sequence to start at too high a power. Open loop power control errors can be caused by poor estimates of uplink interference level, imperfect CPICH_RSCP estimation, insufficient averaging to eliminate Rayleigh fading from CPICH_RSCP estimate, and errors in mobile transmit power calibration. If the error is large enough, the message would be sent at an unnecessarily high power which reduces uplink capacity. On the other hand, smaller values of "Constant Value" result in lower probability of detection unless preamble transmission length and detection integration length is increased. There is therefore a tradeoff of capacity and probability of detection or integration length in choosing this parameter. However, a longer integration length can be tolerated in the case of the Broadcast NACK and given more continuous low level transmission is typical then longer integration times should minimize most of the estimation errors and ensure reliable detection. The gain factor may also be determined in other manners. For example, if at some point the base station 142 determines broadcast NACK power level is above a set threshold, the base station 142 can signal all of the user equipment using the broadcast service k to reduce the power of their broadcast NACK transmission by a set amount. The initial gain factor could always be set to unity, or it could be determined by another algorithm such as described above.

The spread and weighted NACK indicator can then be scrambled at multiplier 350 with a scrambling code $S_p$ 340 to ensure the spread, weighted, scrambled NACK indicator 360 signal spectrum fills the channel bandwidth and is relatively flat across the channel bandwidth. The scrambling code can also be constructed to minimize power amplifier peak to average ratio or power amplifier power back off requirements by constraining its phase shifts on consecutive symbol transmissions such as achieved with HPSK (Hybrid Phase Shift Keying) used in W-CDMA and CDMA2000 1X. The spread, weighted, scrambled NACK indicator 360 can then be output for transmission after other possible filtering, and conversions. In one embodiment, the Broadcast channel NACK indicator transmission duration is 1.33 ms and is time aligned to a time slot of 1.33 ms duration where there are 15 slots in a broadcast NACK channel access period.

Figure 4:
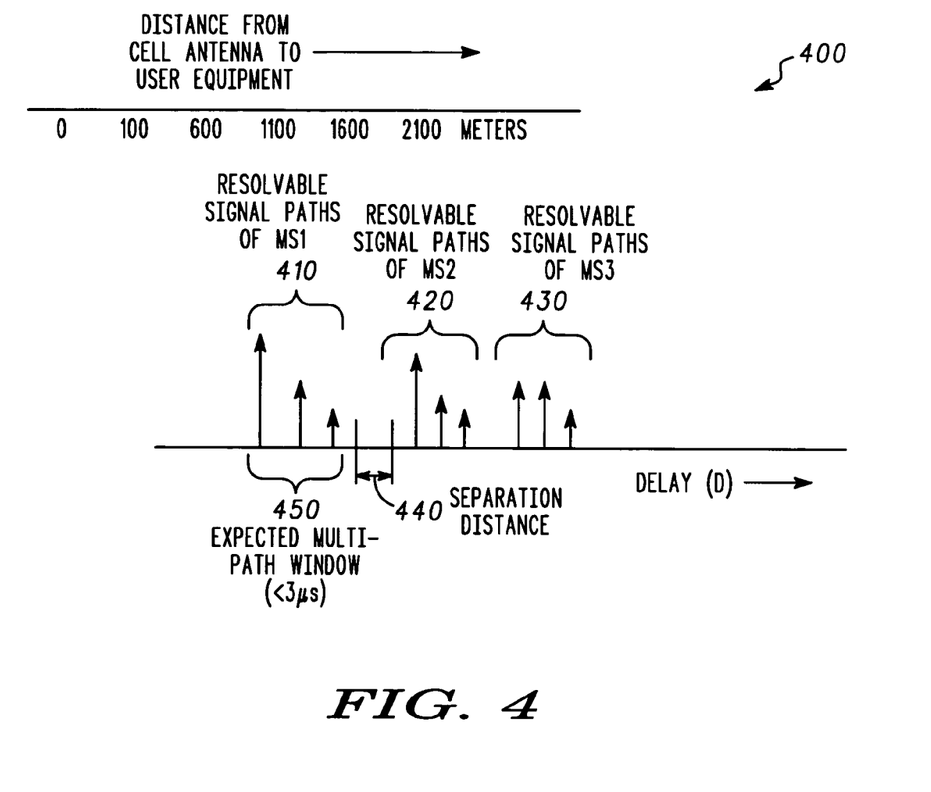
FIG. 4 is an exemplary illustration of signal rays of different user equipment received at a base station.

FIG. 4 is an exemplary illustration 400 of signal rays of different user equipment received at a base station, such as the base station 142. For example, signal rays 410 can be received from user equipment 152, signal rays 420 can be received from user equipment 154, and signal rays 430 can be received from user equipment 156 each having a delay D relative to its distance to the base station 142. Each group of signal rays, such as signal rays 410, can fall within an expected multi-path window based on characteristics of the physical environment affecting the signals between the user equipment 152 and the base station 142. For example, an expected multi-path window size may be less than 3 μs in macro-cellular suburban and urban environments. For example, in a 5 MHz bandwidth and with transmissions spread to a chip rate of 3,840,000 chips per second, approximately three rays, such as signal rays 410, from each user equipment can be resolved by a receiver in a base station in a system 100 with macro-cellular topology. A separation distance 440 can be defined between rays to delineate groups of rays. If the distance between adjacent rays exceeds the separation distance 440, then they are determined to belong to separate groups where each ray group corresponds to particular user equipment at some distance D from the base station 142. Groups of signal rays can be distinguished by using a separation distance and window sizes of, such as of 3 μs, such that the number of users transmitting broadcast NACK channel indicators can be estimated. Another way to estimate the number of user equipment transmitting on the broadcast NACK channel is to take the total number of local maxima found by a broadcast NACK receiver at a base station and divide it by the expected number of rays per user equipment transmission (e.g., 3) for the given bandwidth and chip rate used. The estimate of the number of users can be sensitive to the ability to accurately map each group of rays to a specific user equipment based on the techniques described above (separation distance, multi-path window size, local maxima). In some embodiments, the decision thresholds may account for the variation in the number of users estimate when adjusting the broadcast channel quality.

Figure 5:
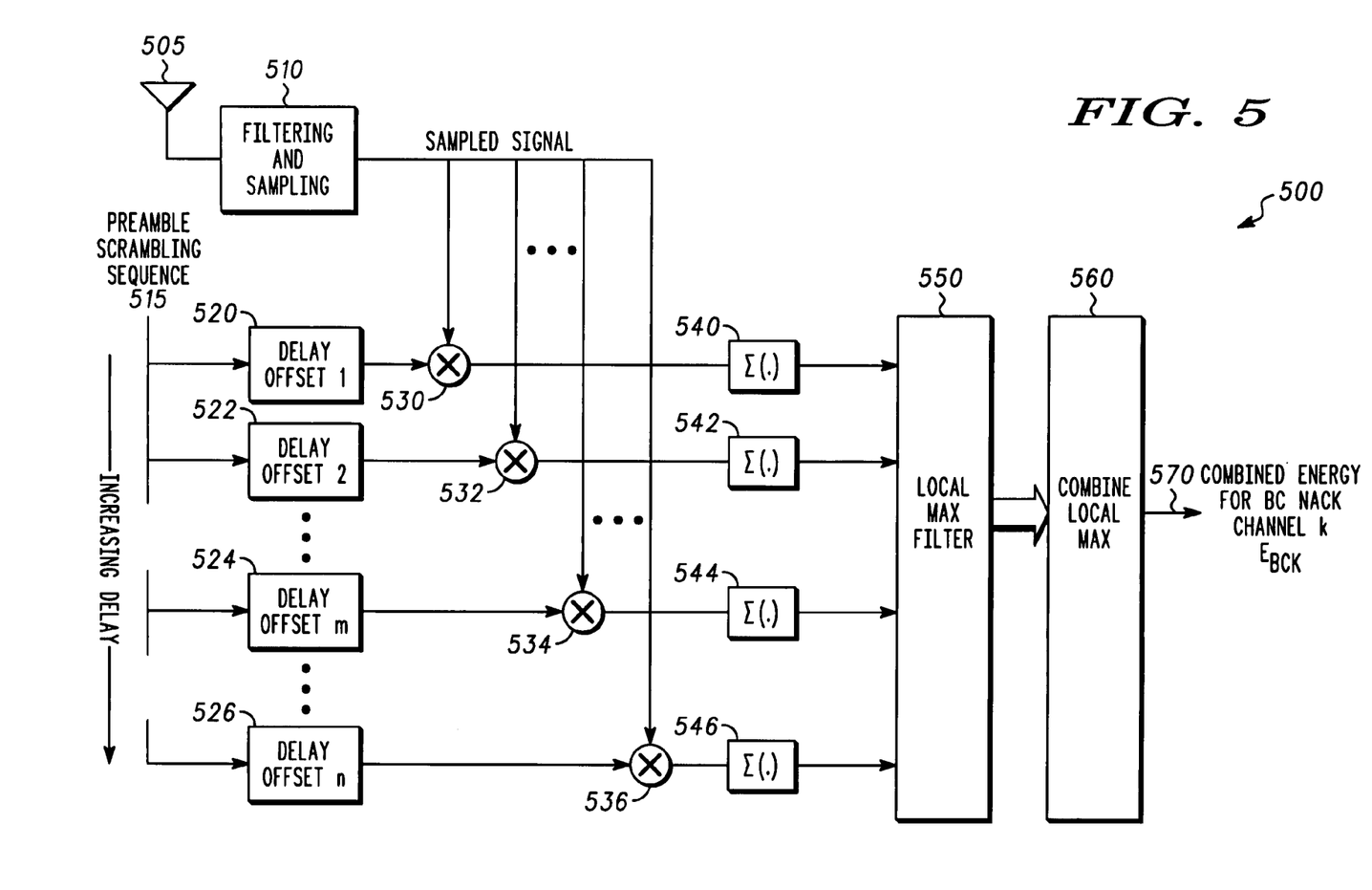
FIG. 5 is an exemplary illustration of a broadcast negative acknowledgement receiver at a base station according to one embodiment.

FIG. 5 is an exemplary illustration of a broadcast NACK receiver 500 at a base station 142 according to one embodiment. The broadcast NACK receiver 500 is illustrative for a CDMA-type wireless system. It is understood that different receivers may be used for different wireless systems. The broadcast NACK receiver 500 can include an antenna 505, a filtering and sampling block 510, delay offset blocks 520, 522, 524, and 526, correlation blocks 530, 532, 534, and 536, summing blocks 540, 542, 544, and 546, a local maxima filter module 550, and a combine local maxima module 560. In one embodiment, there can be one broadcast NACK receiver for each of the broadcast channel NACK indicators 220 given in the table 200. In operation, the antenna 505 can receive a signal from user equipment 152, 154, and 156 which is filtered and sampled in block 510 to produce a sampled signal. The preamble scrambling sequence 515 for a particular broadcast service or broadcast service layer can be delayed by each delay offset block 520, 522, 524, 526 with some delay offset before being correlated with the sampled signal at correlation blocks 530, 532, 534, and 536 with each output then summed in summation blocks 540, 542, 544, and 546. Each summed output can be filtered by the local maxima filter module 550 which, in one embodiment, first computes the magnitude squared of each correlated input and then finds the local maxima over the entire delay space defined by the chosen delay offsets used in the delay blocks. In another embodiment, the local maxima filter module 550 includes frequency correction circuits to allow proper correlation over a desired correlation interval when high Doppler frequencies occur. The magnitude square of each input signal can then be determined as before followed by finding all of the local maxima. The local maxima are combined in the combine local maxima module 560. The resulting combined signal 570 can later be compared to a threshold to determine what action will be taken with regard to changing the quality level of the broadcast channel.

In other embodiments, a different broadcast NACK receiver at a base station may be used for a different wireless system. Other wireless systems, including GPRS and 802.16, may be single or multiple carrier systems using frequency division or time division multiple access. Such systems typically have uplink channels, and the new common uplink channel for sending negative acknowledgements in response to broadcast channel quality may be introduced in a manner that is compatible with other uplink channels. In some embodiments, a random access channel can be used as a common uplink channel, with the access method designed such that broadcast NACK signals for a service k from multiple users will collide or overlap for aggregation within the broadcast NACK receiver at the base station. One embodiment of a receiver structure may be a non-coherent receiver and detector of energy received within a specified time slot or frequency bin. Coarse time and frequency synchronization may be required between the broadcast receiver and the base station.

Figure 6:
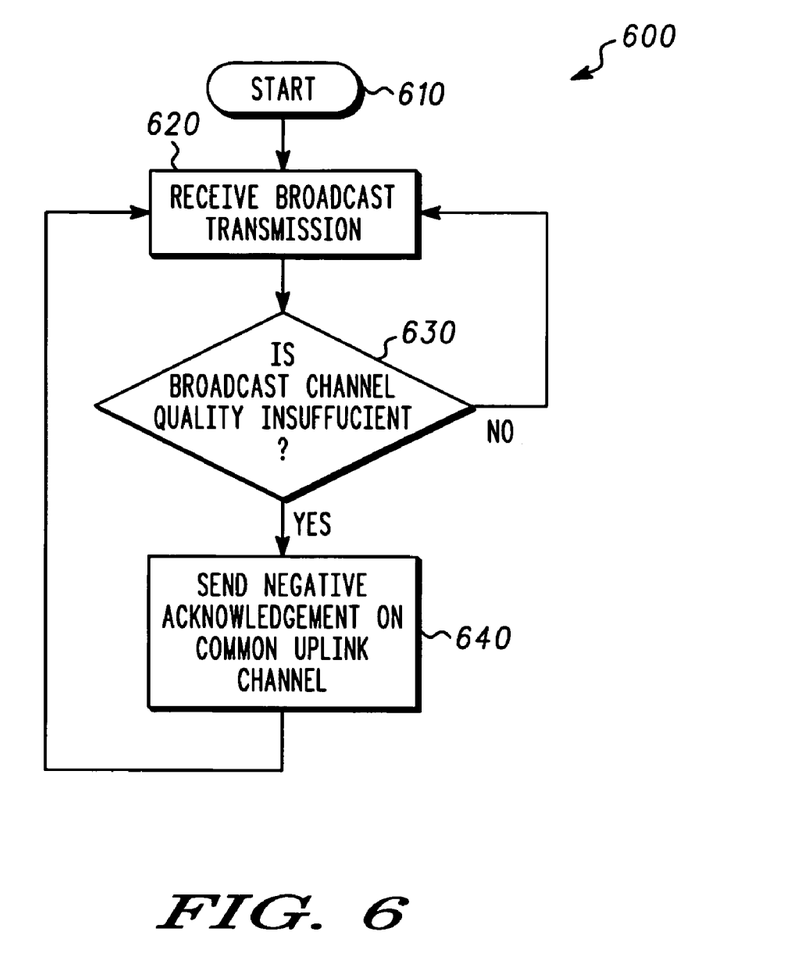
FIG. 6 is an exemplary flowchart outlining the operation of user equipment according to one embodiment.

FIG. 6 is an exemplary flowchart 600 outlining the operation of user equipment, such as user equipment 152, according to one embodiment. In step 610, the flowchart begins. In step 620, the user equipment 152 receives a broadcast transmission. In step 630, the user equipment 152 determines if the broadcast channel quality is insufficient, such as being of poor quality. If not, the user equipment 152 returns to step 620. If so, in step 640, the user equipment 152 sends a broadcast channel NACK on a common uplink channel, such as a broadcast channel NACK channel, or any other useful channel. The user equipment 152 then returns to step 620.

Figure 7:
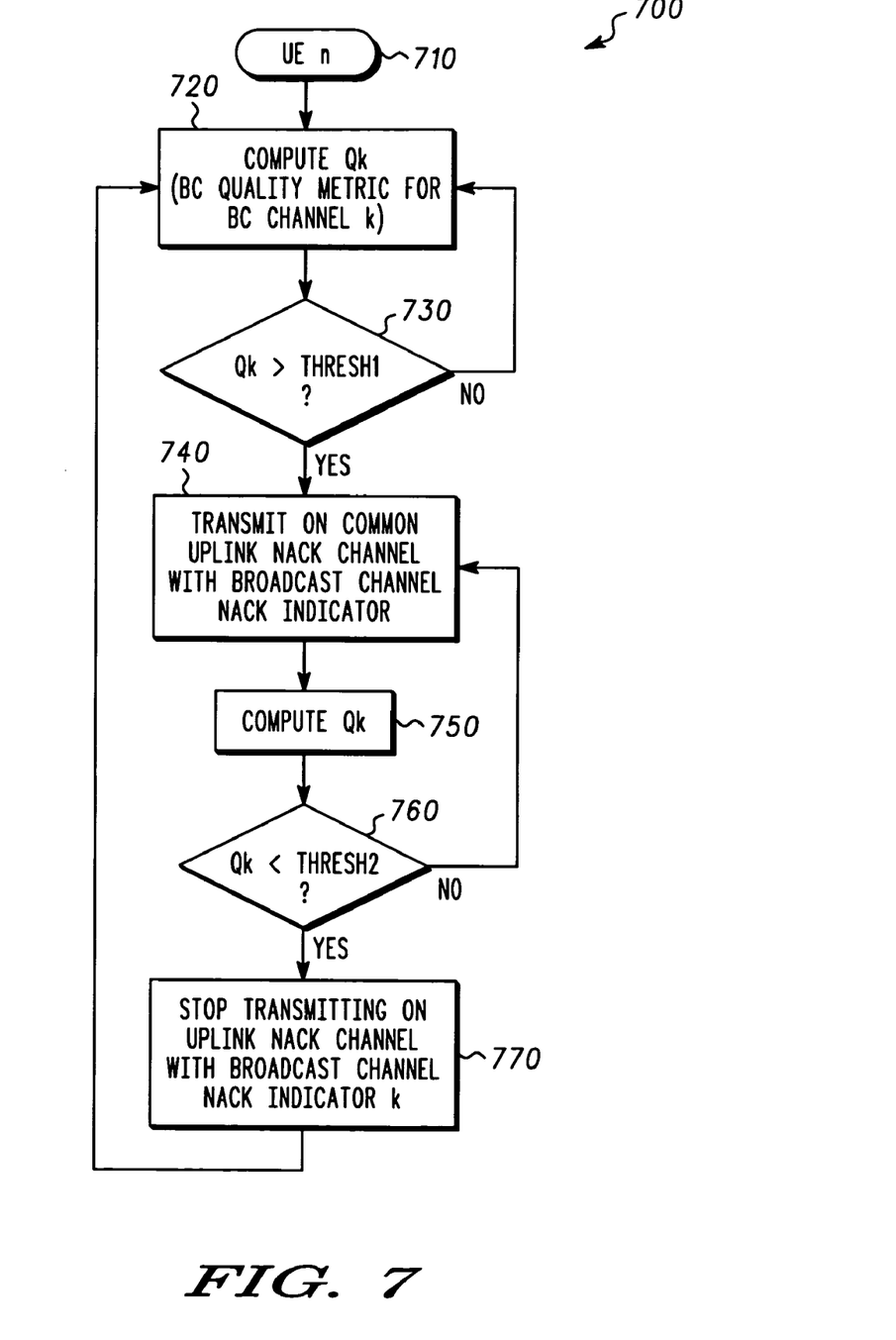
FIG. 7 is an exemplary flowchart outlining the operation of user equipment according to another related embodiment.

FIG. 7 is an exemplary flowchart 700 outlining the operation of user equipment, such as user equipment 152, according to another related embodiment. The steps of the flowchart 700 may be utilized in, but are not necessary for, operation of the flowchart 600. In step 710, the flowchart begins. In step 720, the user equipment 152 computes the broadcast channel quality metric $Q_k$ for a selected broadcast channel k. For example, the user equipment 152 can determine a broadcast channel quality metric $Q_k$ based on whether a cyclic redundancy check fails or not for a given frame. As another example, the user equipment 152 can determine a broadcast channel quality metric $Q_k$ based on comparing a sum of all bad frames to a sum of all frames over a selected time interval. In step 730, the user equipment 152 can determine if the broadcast channel quality metric $Q_k$ is above a first threshold 1. If the broadcast channel quality metric $Q_k$ is less than or equal to the threshold 1, the flowchart 700 returns to step 720. If the broadcast channel quality metric $Q_k$ is above the threshold 1, in step 740 the user equipment 152 transmits a broadcast channel NACK indicator on a common uplink NACK channel. In step 750, the user equipment 152 can recompute the broadcast channel quality metric $Q_k$ for a next frame or time interval. The user equipment 152 recomputes the broadcast channel quality metric $Q_k$ in this section to determine if it should stop transmitting on the common uplink NACK channel. If in step 760 the broadcast channel quality metric $Q_k$ is greater than or equal to a second threshold 2, the flowchart returns to step 740. If the broadcast channel quality metric $Q_k$ less than the second threshold 2, in step 770, the user equipment 152 stops transmitting the broadcast channel NACK indicator on the common uplink NACK channel and returns to step 720. An example of a first threshold 1 is 2% frame error rate and for a second threshold 2 is 1% frame error rate. The two thresholds can provide a hysteresis effect such that once a NACK is sent, it will continue to be sent until the quality metric (e.g. frame error rate) drops below a certain amount. As such, other embodiments may be possible that also provide a hysteresis effect (such as a single time varying threshold), or if the hysteresis effect is not desired the second threshold may be set to the first threshold or the second threshold loop can be dropped entirely.

Figure 8:
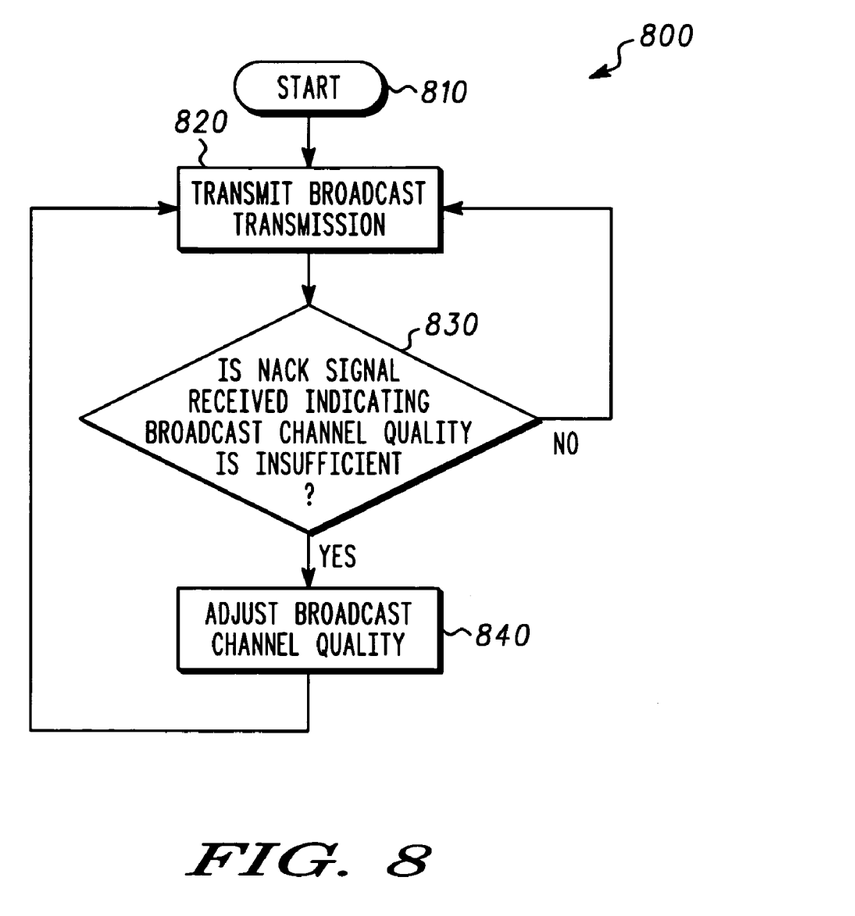
FIG. 8 is an exemplary flowchart outlining the operation of a base station according to one embodiment.

FIG. 8 is an exemplary flowchart 800 outlining the operation of a base station, such as the base station 142, according to one embodiment. In step 810, the flowchart begins. In step 820, the base station 142 transmits a broadcast service transmission. In step 830, the base station 142 determines if a broadcast channel NACK is received that indicates the broadcast channel quality is insufficient, such as being of poor quality. If not, the base station 142 returns to step 820. If so, in step 840, the base station 142 adjusts the broadcast channel quality and returns to step 820.

Figure 9:
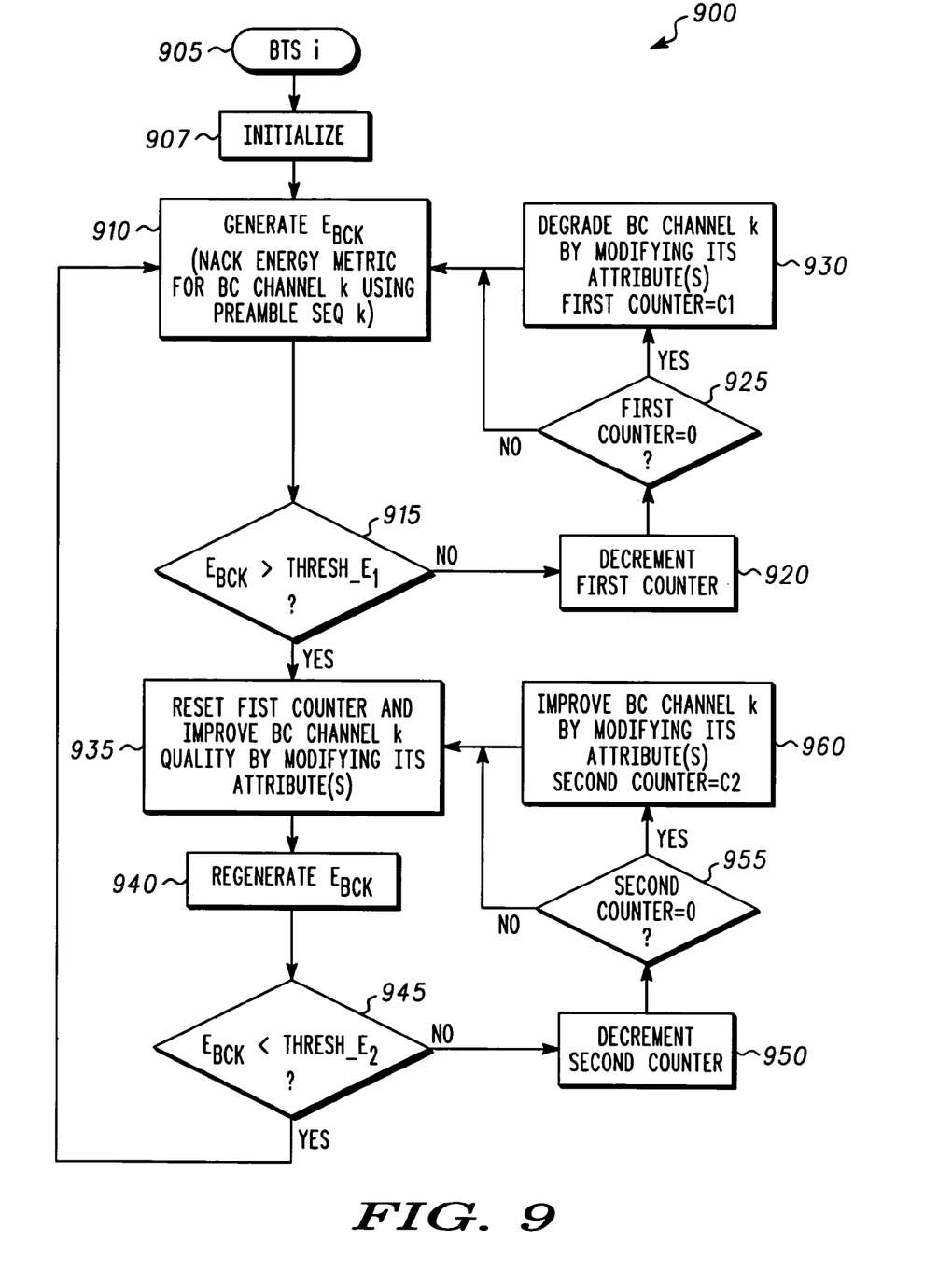
FIG. 9 is an exemplary flowchart outlining the operation of a base station according to another related embodiment.

FIG. 9 is an exemplary flowchart 900 outlining the operation of a base station, such as base station 142, according to another related embodiment. The steps of the flowchart 900 may be utilized in, but are not necessary for, operation of the flowchart 800. In step 905, the flowchart begins and operates while the base station 142 is transmitting a broadcast transmission on a broadcast channel k. In step 907, the base station 142 initializes a broadcast transmission quality adjustment process. For example, the base station 142 can initialize a first counter and second counter to predetermined values. In step 910, the base station 142 generates a NACK energy metric $E_{BCk}$ for the broadcast channel k. For example, the base station 142 can generate the NACK energy metric $E_{BCk}$ using broadcast channel NACK signals received by the broadcast NACK receiver 500. In step 915, the base station 142 compares the energy metric $E_{BCk}$ to a third threshold $E_1$. If the energy metric $E_{BCk}$ is less than or equal to the threshold $E_1$, in step 920 the base station 142 decrements the first counter. In step 925, the base station determines if the first counter has reached zero. If not, the base station returns to step 910. If so, in step 930, the base station can modify one or more attributes of the broadcast channel k and reset the first counter. For example, the base station 142 can modify one or more attributes by reducing a signal strength, increasing a coding rate, increasing a data rate, reducing the bandwidth, decreasing a fraction of code space utilized, or modifying other relevant attributes. Thus, the base station 142 can determine when a sufficient or excessive quality of broadcast transmission is being transmitted and can adjust attributes to reduce resources allocated to the broadcast transmission. For example, increasing the date rate can reduce the amount of time required for a transmission.

If in step 915, the energy metric $E_{BCk}$ is greater than the threshold $E_1$, in step 935, the base station 142 can reset the first counter to the predetermined value and modify one or more attributes of the broadcast channel k. For example, the base station 142 can modify one or more attributes to increase channel quality by increasing a signal strength, decreasing a coding rate, decreasing a data rate, increasing the bandwidth, increasing a fraction of code space utilized, or modifying other relevant attributes. For example, when the data rate is decreased, the channel quality for the reduced broadcast service is increased. In step 940, the base station 142 the base station 142 regenerates the NACK energy metric $E_{BCk}$ for the broadcast channel k. In step 945, the base station 142 compares the energy metric $E_{BCk}$ to a fourth threshold $E_2$. If the energy metric $E_{BCk}$ is greater than or equal to the threshold $E_2$, in step 950, the base station 142 decrements the second counter. In step 955, the base station 142 determines if the second counter has reached zero. If not, the base station returns to step 940. If so, in step 960, the base station 142 can modify one or more attributes of the broadcast channel k and reset the second counter. Thus, the base station 142 can determine when an insufficient quality of broadcast transmission is being transmitted and can adjust attributes to increase resources allocated to the broadcast transmission. If, in step 945, the energy metric $E_{BCk}$ is less than the threshold $E_2$, the base station 142 resets the second counter and returns to step 910.

Additionally if at some point the base station 142 determines broadcast NACK energy metric $E_{BCk}$ is above a set threshold, the base station 142 can signal the user equipment using the broadcast service k to reduce the power of their broadcast NACK transmission by a set amount.

In another embodiment the number of users is estimated from $E_{BCk}$ and an estimated number of ray groups based on separation distance and assumed multi-path window sizes or from $E_{BCk}$ and number local maxima. The estimated number of users transmitting on the broadcast NACK channel for a broadcast service k is then compared to a number of users threshold and, if exceeded, a modification of at least one attribute of the broadcast service k is made to increase its quality by some set amount otherwise the attribute is not modified or is modified to decrease the broadcast service k quality by some second set amount.

The method of this invention is preferably implemented on a programmed processor. However, the flowcharts may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the invention by simply employing the elements of the independent claims. Accordingly, the preferred embodiments of the invention as set forth herein are intended to be illustrative, not limiting. Various changes may be made without departing from the spirit and scope of the invention.

What is claimed is:

1. A method for adaptive broadcast reception in a wireless device, comprising:
    receiving a broadcast transmission;
    determining a broadcast channel quality is insufficient; and
    sending a negative acknowledgement signal on a common uplink channel in response to determining the broadcast channel quality is insufficient.

2. The method according to claim 1, wherein the negative acknowledgement signal indicates the negative acknowledgement signal is directed to a specific broadcast transmission.

3. The method according to claim 2, wherein the negative acknowledgement signal indicates the negative acknowledgement signal is directed to a specific broadcast transmission by using at least one of a pseudo noise sequence offset, a preamble sequence selection, and a time slot assignment.

4. The method according to claim 1, wherein determining the broadcast channel quality is insufficient determines the broadcast channel quality is insufficient based on at least one of detecting a selected amount of broadcast packet errors, detecting a selected amount of frame erasures, detecting a symbol error rate is above a threshold, detecting an undesirable signal to noise ratio, and detecting a broadcast packet error using a cyclic redundancy check code.

5. The method according to claim 1, wherein the common uplink channel is a random access channel.

6. The method according to claim 1, wherein determining a broadcast channel quality is insufficient further comprises determining a specific layer quality of a multi-layer broadcast service channel is insufficient, and
    wherein sending a negative acknowledgement signal on a common uplink channel in response to determining the broadcast channel quality is insufficient further comprises sending a negative acknowledgement signal on a common uplink channel indicating the specific layer quality is insufficient in response to determining the broadcast channel quality is insufficient.

7. The method according to claim 1, wherein determining a broadcast channel quality is insufficient further comprises:
    computing a broadcast channel quality metric;
    comparing the broadcast channel quality metric to a threshold; and determining the broadcast channel quality is insufficient based on a result of comparing the broadcast channel quality metric to the threshold.

8. The method according to claim 7, wherein determining the broadcast channel quality is insufficient based on a result of comparing the broadcast channel quality metric to the threshold determines the broadcast channel quality is insufficient if the broadcast channel quality metric exceeds the threshold.

9. An apparatus for adaptive broadcast reception in a wireless device, comprising:
a transceiver configured to receive a broadcast transmission; and
a controller configured to determine whether a broadcast channel quality is insufficient and send a negative acknowledgement signal on a common uplink channel in response to determining the broadcast channel quality is insufficient.

10. The apparatus according to claim 9, wherein the negative acknowledgement signal indicates the negative acknowledgement signal is directed to a specific broadcast transmission.

11. The apparatus according to claim 9, wherein the negative acknowledgement signal indicates the negative acknowledgement signal is directed to a specific broadcast transmission by using at least one of a pseudo noise sequence offset, a preamble sequence selection, and a time slot assignment.

12. The apparatus according to claim 9, wherein the controller determines the broadcast channel quality is insufficient based on at least one of detecting a selected amount of broadcast packet errors, detecting a selected amount of frame erasures, detecting a symbol error rate is above a threshold, detecting an undesirable signal to noise ratio, and detecting a broadcast packet error using a cyclic redundancy check code.

13. The apparatus according to claim 9, wherein the common uplink channel is a random access channel.

14. The apparatus according to claim 9, wherein the controller determines a broadcast channel quality is insufficient by determining a specific layer quality of a multi-layer broadcast service channel is insufficient, and
wherein the controller sends a negative acknowledgement signal on a common uplink channel in response to determining the broadcast channel quality is insufficient by sending a negative acknowledgement signal on a common uplink channel indicating the specific layer quality is insufficient.

15. The apparatus according to claim 9, wherein the controller further determines the broadcast channel quality is insufficient by computing a broadcast channel quality metric, comparing the broadcast channel quality metric to a threshold, and determining the broadcast channel quality is insufficient based on a result of comparing the broadcast channel quality metric to the threshold.

16. The apparatus according to claim 15, wherein the controller determines the broadcast channel quality is insufficient based on a result of comparing the broadcast channel quality metric to the threshold by determining the broadcast channel quality is insufficient if the broadcast channel quality metric exceeds the threshold.

17. A method for adaptive broadcast transmission in a wireless system, comprising:
transmitting a broadcast transmission on a broadcast channel;

receiving a negative acknowledgement signal on a common uplink channel, the negative acknowledgement signal indicating broadcast channel quality is insufficient; and
adjusting the broadcast channel quality in response to receiving the negative acknowledgement signal.

18. The method according to claim 17, wherein the adjusting the broadcast channel quality comprises at least one of increasing a bandwidth of the broadcast transmission, increasing a power of the broadcast transmission, decreasing a code rate of the broadcast transmission, decreasing an information rate of the broadcast transmission, stopping the broadcast transmission, and increasing a number of time slots assigned to the broadcast transmission.

19. The method according to claim 17, further comprising:
determining the negative acknowledgement signal as belonging to a specific broadcast transmission,
wherein the adjusting further comprises adjusting an attribute of the specific broadcast transmission in response to receiving the negative acknowledgement signal.

20. The method according to claim 19, wherein determining the negative acknowledgement signal as belonging to a specific broadcast transmission determines the negative acknowledgement signal as belonging to a specific broadcast transmission by using at least one of a pseudo noise sequence offset, a preamble sequence selection, and a time slot assignment.

21. The method according to claim 17, further comprising:
generating an energy metric; and
determining the broadcast channel quality is insufficient by comparing the energy metric to a threshold.

22. The method according to claim 17, wherein adjusting the broadcast channel quality in response to receiving the negative acknowledgement signal further comprises modifying attributes of the broadcast channel.

23. The method according to claim 22, wherein the attributes of the broadcast channel include at least one of a signal strength, a coding rate, a data rate, a bandwidth, and a fraction of code space utilized.

24. The method according to claim 17,
wherein receiving a negative acknowledgement signal on a common uplink channel comprises receiving a plurality of negative acknowledgement signals on a common uplink channel from a plurality of users, and
wherein the method further comprises aggregating the plurality of negative acknowledgement signals.

25. An apparatus for adaptive broadcast transmission in a wireless system, comprising:
a transceiver configured to transmit a broadcast transmission on a broadcast channel; and
a controller configured to receive a negative acknowledgement signal on a common uplink channel, the negative acknowledgement signal indicating a broadcast channel quality is insufficient, wherein the controller is further configured to adjust the broadcast channel quality in response to receiving tho negative acknowledgement signal.

26. The apparatus according to claim 25, wherein the controller adjusts the broadcast channel quality by at least one of increasing a bandwidth of the broadcast transmission, increasing a power of the broadcast transmission, decreasing a code rate of the broadcast transmission, decreasing an information rate of the broadcast transmission, stopping the broadcast transmission, and increasing a number of time slots assigned to the broadcast transmission.

27. The apparatus according to claim 25, wherein the controller is further configured to determine the negative acknowledgement signal as belonging to a specific broadcast transmission and adjust an attribute of the specific broadcast transmission in response to receiving the negative acknowledgement signal.

28. The apparatus according to claim 27, wherein the controller is further configured to determine the negative acknowledgement signal as belonging to a specific broadcast transmission by using at least one of a pseudo noise sequence offset, a preamble sequence selection, and a time slot assignment.

29. The apparatus according to claim 25, wherein the controller is further configured to generate an energy metric and determine the broadcast channel quality is insufficient by comparing the energy metric to a threshold.

30. The apparatus according to claim 25, wherein the controller adjusts the broadcast channel quality in response to receiving the negative acknowledgement signal by modifying attributes of the broadcast channel.

31. The apparatus according to claim 30, wherein the attributes of the broadcast channel include at least one of a signal strength, a coding rate, a data rate, a bandwidth, and a fraction of code space utilized.

32. The apparatus according to claim 25,
wherein the controller receives a negative acknowledgement signal on a common uplink channel by receiving a plurality of negative acknowledgement signals on a common uplink channel from a plurality of users, and
wherein the controller is further configured to aggregate the plurality of negative acknowledgement signals.

* * * * *